United States Patent [19]

Wang et al.

[11] Patent Number: 5,705,810
[45] Date of Patent: Jan. 6, 1998

[54] LASER OPTICAL TORQUEMETER

[76] Inventors: Qi Wang, 500 Eastdale Rd. S, H-2, Montgomery, Ala. 36117; Xiubao Huang, 4772 Newhope St. South, Liverpool, N.Y. 13090

[21] Appl. No.: 566,119

[22] Filed: Dec. 1, 1995

[51] Int. Cl.⁶ .................................................. G01D 5/34
[52] U.S. Cl. ........................ 250/231.13; 73/862.324; 356/152.3; 250/231.1
[58] Field of Search .................... 250/231.1, 231.13; 356/152.3; 73/862.324, 862.325, 862.326

[56] References Cited

U.S. PATENT DOCUMENTS

4,698,491  10/1987  Lysen ....................................... 250/201
4,874,245  10/1989  Spillman, Jr. et al. ................. 356/364

*Primary Examiner*—Edward P. Westin
*Assistant Examiner*—Alan L. Giles

[57] ABSTRACT

A device intended to measure the torque, transmitted by a rotating shaft S1. This device has no physical connection with measured shafts. It employs a laser beam S, S' and a retroreflector RM of which the plane mirrors M1 and M2 are mounted on the torsional shaft S4 and transfer shaft S5 respectively or any other optical system, and it displays the torsion or torque as a function of angular displacement of the laser beam S' It may be used to determine the torque of either stationary or rotating shafts.

10 Claims, 7 Drawing Sheets

LASER OPTICAL TORQUEMETER

BACKGROUND OF THE INVENTION

The present invention relates to non-contact optical type apparatus for determining the torque of rotating shafts. Combined with the shaft rotating speed, the shaft power can be determined from the measured torque.

The developments on rotating torque measurement technology, especially through non-contact torque measurement, enable us to measure the power transmission through a shaft accurately from a measurement member which experiences torsional strain due to the torque transmitted.

Devices of this type are mainly used to accurately measure the power transmission through a shaft by a measurement member which experiences torsional strain due to the torque transmitted. Surface strain gage method is one type of these torque measurement devices, and the torque measurement is achieved through surface strain measurement. The strain signals are transmitted from the rotating shaft to the stationary device by several methods such as: slip rings, radio telemetry, or rotary transformer. However, these strain gage-type torque measuring devices are complicated in practical applications due to signal transmission between rotating and stationary frames, transducer installation, and maintenance, because of using bearings and lubrication. They only have limited operating temperature and speed range due to some gages or electronics on the rotating part.

Another type of rotary torque transducer is the angular twist-type, which utilizes the principle of measuring the angular twist in a gage length, which is proportional to the torque transmitted. The angular twist may be measured in a number of ways, say by relative displacement of two disks. The present invention is an angular twist-type device. However, the use of a laser and an optical system described in the present invention requires no physical connection to the rotating shaft, and is therefore most desirable.

OBJECTS AND SUMMARY OF THE INVENTION

Accordingly, the object of this invention is to provide a device to accurately measure the shaft rotating torque without physical contact and requires relatively little effort for construction and use for a wide temperature and speed range.

The object of the invention is attained by torque measurement devices which measure the torque as a function of angular deflection accumulated over a gauging length of the sensing member which is joined with the shaft from which torque is transmitted and using the deflection to affect the reflection of the light beams. In the embodiment hereinafter described in greatest detail, the sensing member comprises a torsional shaft and a transfer shaft which are joined rigidly at one end and free to rotate with respect to each other at the other end. A retroreflector is formed at the free end by two plane mirrors constructed on the torsional and transfer shaft respectively with the apex axis of the mirror system parallel to the shaft. The measurement utilizes the property of the retroreflector that a beam, which is perpendicular to the apex axis, will be reflected back at a 180 angle no matter which direction it comes in. As a torque is applied to the shaft, an angular twist, which is proportional to the torque, causes a small deflection of mirrors which are set 90 degrees apart initially. A relative angular displacement between two mirrors, due to the angular twist, results in the reflected light to be rotated through an angle that is twice of the angular displacement between mirrors. The reflected beam is focused onto a position sensitive photo-detector on which the deflected angle is measured as a position change on the detector surface. On the transfer shaft, a window is made to allow the light beams to pass through. In the course of rotation of the shaft, the rotating retroreflector reflects the beam back to the detector about every 20 degree, determined by the size of window and mirrors, of each turn of shaft. When no torque is on the shaft, the angle between two mirrors will be 90 degree as set initially, and a zero deflecting angle is shown on the position sensitive detector. When the shaft is loaded with torque, the angle departs from 90 degrees, which causes a position change of reflected beam on the detector. The rotating torque transmitted through the sensing member can therefore be determined from the deflecting angle.

In the embodiment described above, the signal transmission of shaft angular deflection between the rotating and stationary frames is achieved by light reflecting upon the retroreflector, hence the measurement is non-contact. The stand-alone light emitter and receiver housed in the same casing, with no physical connection with the measurement member, can be used for different sensing members to cover different torque ranges to achieve cost effectiveness. For a typical installation, it is intended to slip in place of the conventional spacer coupling and need no feet for support. Since no bearings, hence no lubrication, are used, the inventive device is maintenance free after installation. Because the sensing is achieved by light reflecting upon the retroreflector which is constructed out of metal mirrors, there is no electronic attachment on the rotating part sensing member. Thus the devices can be used in a wide speed and temperature range.

BRIEF DESCRIPTION OF THE DRAWINGS

The invention is described in greater detail by means of drawing and examples of operation:

FIG. 3b shows the front view of FIG. 3a;

DETAILED DESCRIPTION OF THE PREFERRED EMBODIMENTS

Figure 1A:
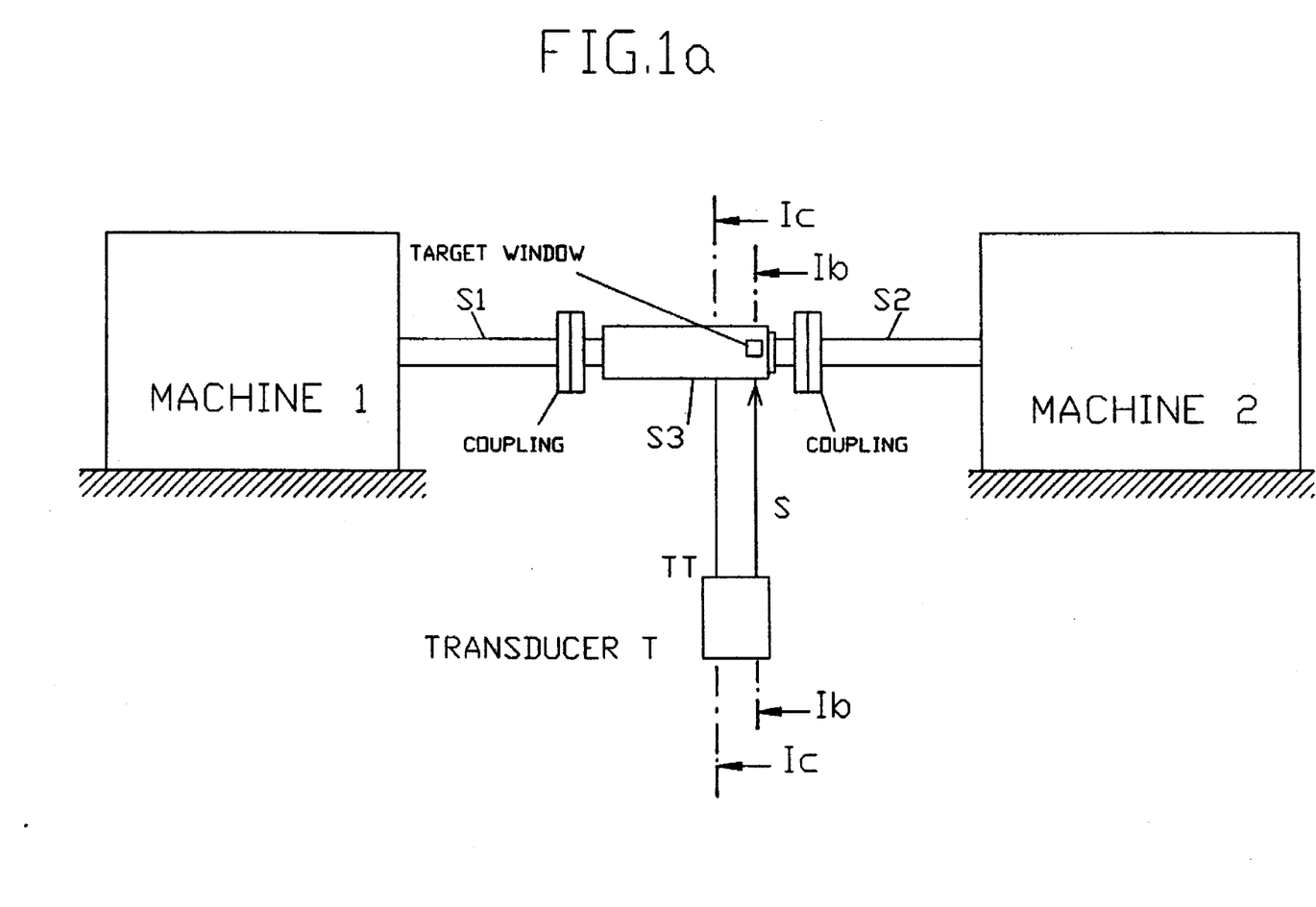
FIG. 1a shows the schematic top view of the inventive device with sensing member connected with shafts and transducer position relative to the sensing member.
Figure 1B:
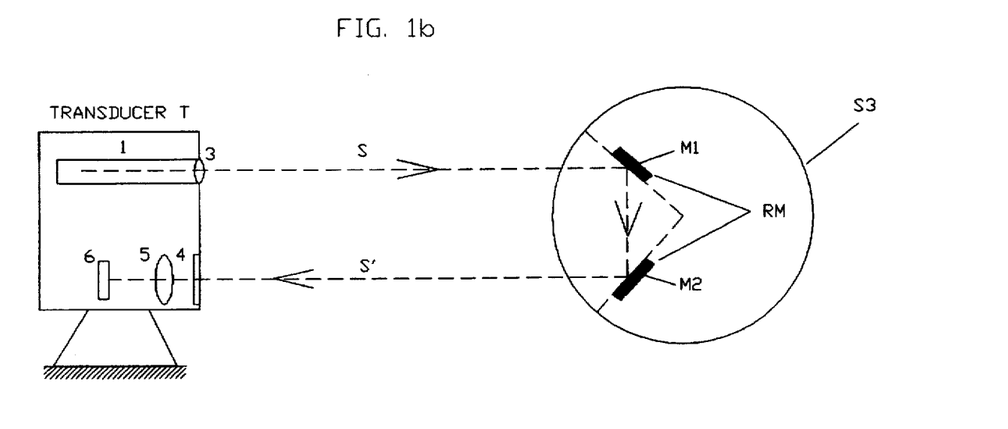
FIG. 1b shows the transducer of the device of FIG. 1a in greater detail looking in the direction of shaft axis.
Figure 1C:
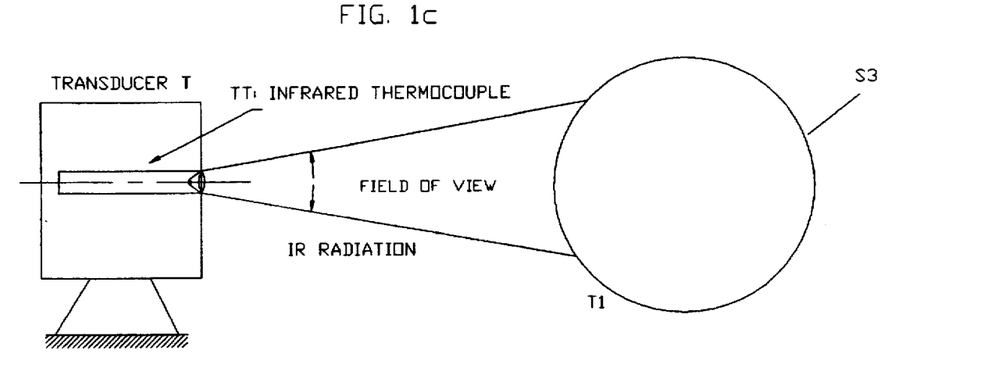
FIG. 1c shows a non-contact temperature measurement module of the device in FIG. 1a in greater detail looking in direction of shaft axis.
Figure 2A:
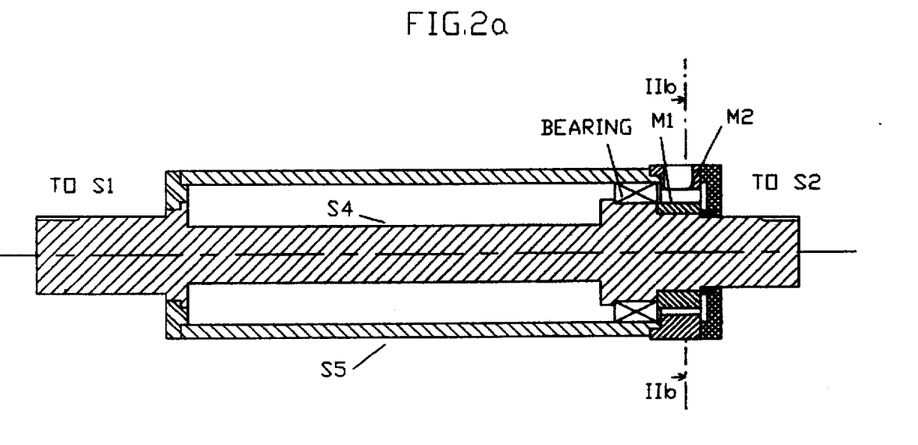
FIG. 2a shows the front view of the sensing member of the device of FIG. 1 in greater detail.
Figure 2B:
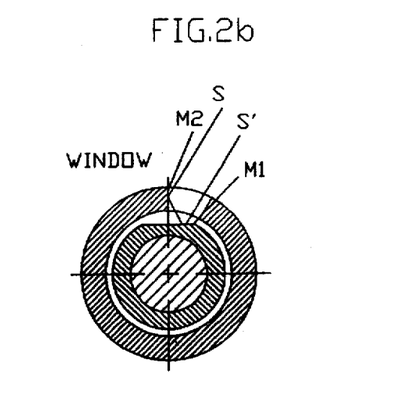
FIG. 2b shows the side view of the sensing member of the device of FIG. 1 in greater detail looking in the direction of shaft axis.

In FIG. 1 and 2 of the drawing, the measurement member S3 is mechanically coupled with shaft S1 and shaft S2 through which rotating torque is transmitted. The torque is measured as a function of angular deflection accumulated over a gauging length of the sensing member S3. The sensing member S3 comprises a torsional shaft S4 and a hollow transfer shaft S5 joined rigidly at one end and free to rotate with respect to each other at the other end. A bearing is placed between S4 and S5 at the free rotating end to support the transfer shaft and minimize the friction in the direction of angular movement. A plane mirror M1 is attached to the stressed torsional shaft S4 and another plane mirror M2 is attached to the transfer shaft S5 at essentially the same axial location located at the free end of the sensing member to form a retroreflector RM with the apex axis of the mirror system essentially parallel to the shaft S4. A light beam S emitted from transducer T is aimed, perpendicularly to the apex axis, at the mirror M1 which will be reflected to mirror M2 and back to the transducer T as beam S' through a window on S5 due to the special property of the retroreflector. As a torque is applied to the shaft S4, an angular twist, which is proportional to the torque, will cause a small deflection of the mirrors which are set 90 degree apart initially. This twist causes a relative angular displacement between mirror M1 and M2, which in turn, causes the reflected light S' to be rotated through an angle that is twice the angular displacement between the mirrors. The reflected beam S' is focused by a lens 5 onto a position sensitive photo-detector 6 on which the deflected angle is measured as a position change on the detector surface. In the course of rotation of the shaft, the rotating retroreflector RM will always reflect the beam S back to the detector about every 20 degree for each rotation. If there is no torque on the shaft, the angle between mirror M1 and M2 will be 90 degrees as it is initially set, which will show zero deflection angle on detector 6. When torque is applied, the angle will depart from 90 degrees, which will cause a position change of the reflected beam S' on detector 6. The rotating torque transmitted through the sensing member can therefore be determined from the deflecting angle.

As shown in FIG. 1b, the transducer T is composed of a laser emitter 1 which emits a collimated light beam S through a focusing lens 3, and a receiver with a band passing filter 4, a focusing lens 5 and a position sensitive detector 6, all of which are housed in the same casing. The transducer T is positioned facing the window on the sensing member S3 in such a way that the beam S, S' are essentially perpendicular to the apex axis of mirror system.

Also shown in FIG. 1c, an infrared thermocouple TT for non-contact temperature measurement, part of transducer T, is aligned with the temperature target T1 on the sensing member S3. The thermal target T1 is constructed out of a special coating with known thermal emmisivity so that the measured target S3 temperature can be used to compensate the Young's Modulus of elasticity of the shaft S4 material to achieve a greater accuracy of the torque measurement.

Figure 3A:
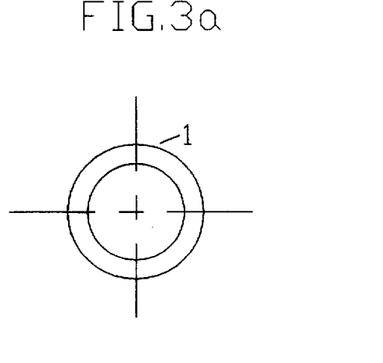
FIG. 3a shows a schematic view of a preferred version of the measurement transmitter.
Figure 3B:
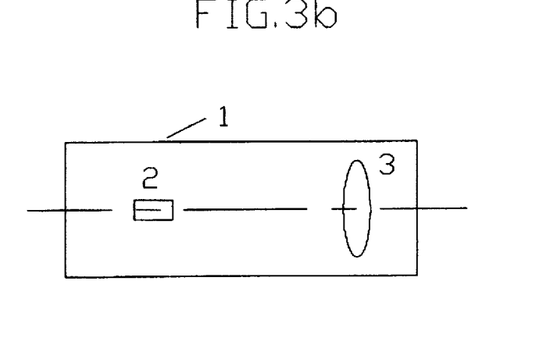

The light emitter 1, as shown in FIG. 3a and FIG. 3b, has a laser emitting crystal 2 and a collimating lens 3 and produces a light beam S with very low divergence of the order of magnitude of less than 1 mrad.

Figure 4:
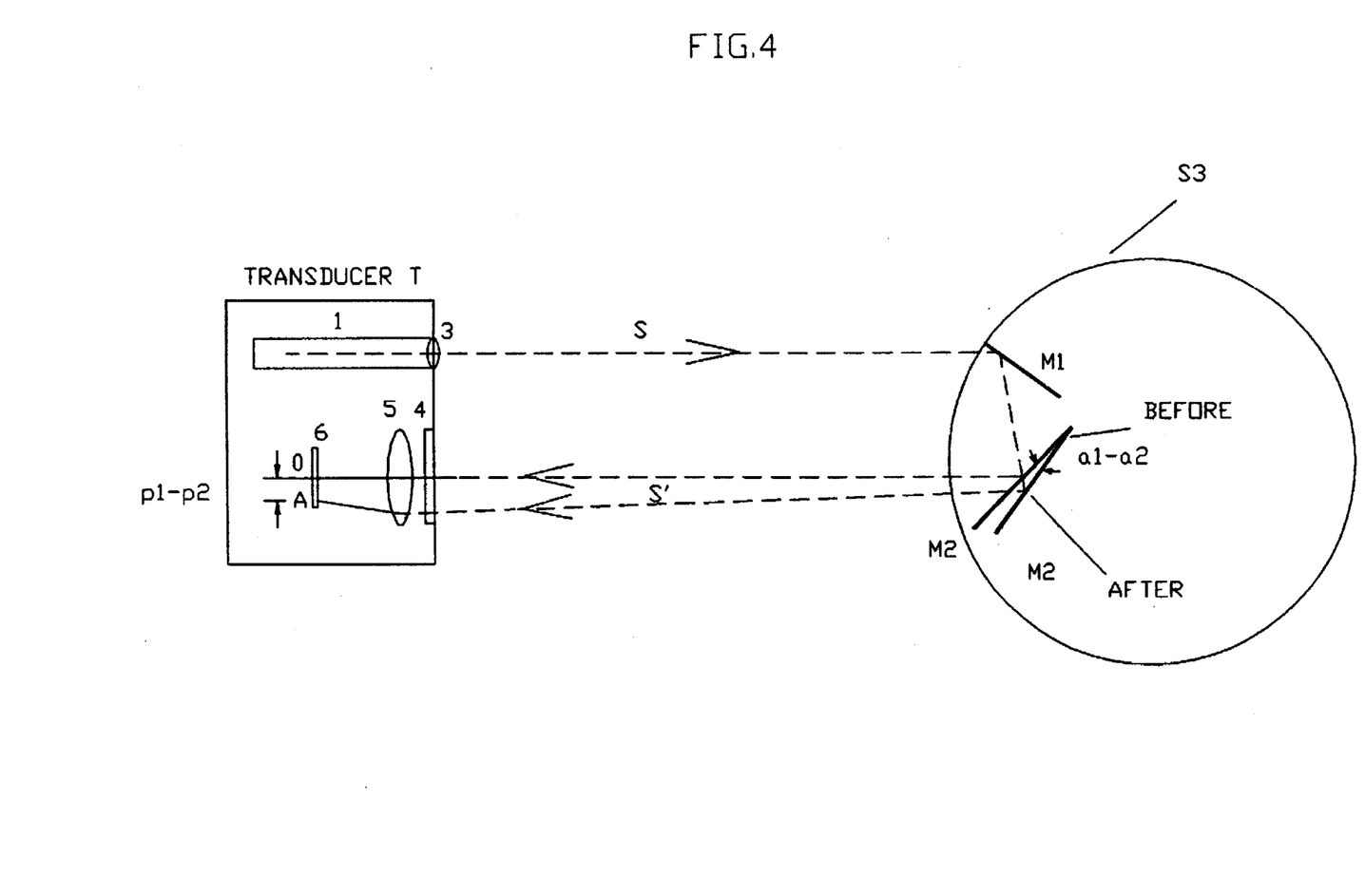
FIG. 4 shows the side view of the retroreflector (constructed out of two plane mirrors perpendicular to each other) acting as measurement receiver, and various angular mirror positions before and after experiencing an angular twist due to torque.

As the measurement member S4 experiences an angular twist of $(\alpha_1-\alpha_2)$, as shown in FIG. 4, the beam S striking at the mirror M1 of the retroreflector RM, which is set 90 degree apart from mirror M2 initially, undergoes a twist, is reflected back to the transducer T as beam S' and focused by lens 5 onto the photodetectors 6 with a relative beam position change of $(p_1-p_2)$.

Figure 5A:
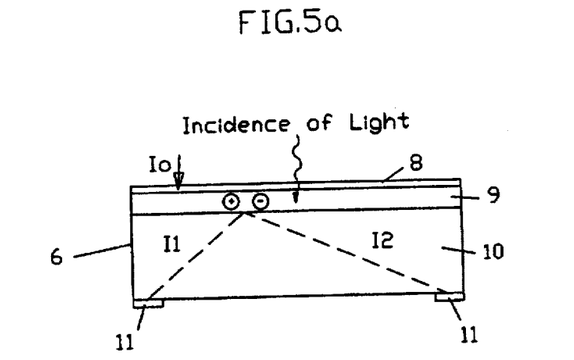
FIG. 5a shows the section through an analogous photoelectric semiconductor position detector, used in the invention as an additional measurement receiver, to demonstrate the principle of the operation.
Figure 5B:
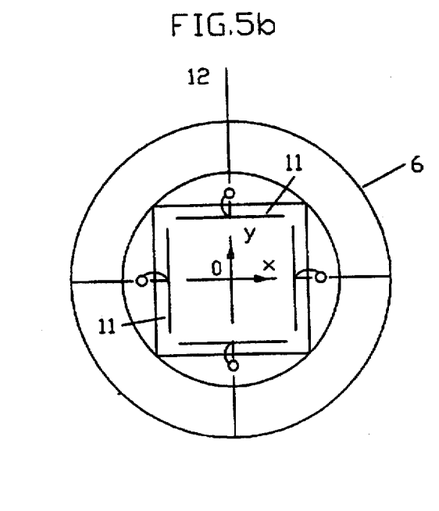
FIG. 5b shows a front view of the function detector of FIG. 5a in bi-axial version.
Figure 5C:
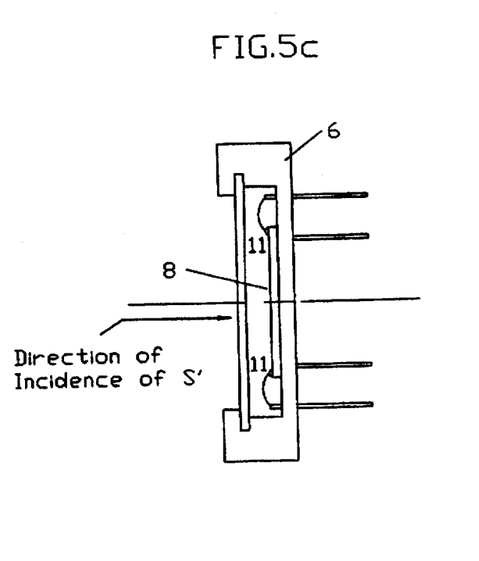
FIG. 5c shows a side view of the function detector of FIG. 5a in bi-axial version.

FIG. 5a and FIG. 5b show, in great detail, a bi-axial position sensing photoelectric detector 6 which has a surface 8 of gold, below this a depletion zone 9 and below this again a high-resistance substrate 10. A current $I_0$ is generated upon receiving a laser beam, which is then distributed into components over the collector strips 11, depending on the site at which an incident beam strikes the gold surface. In the version shown in FIGS. 5, the current $I_0$ supplied is divided into four components, which are discharged over individual collector strips 11 and magnitude of which depends on the distance of the incident point of the laser from the center of the gold surface. Position detectors of the type described above are known and commercially available. This bi-axial detector 6 is rigidly attached to the laser emitter 1 in such a manner that its sensing direction defined by one axis of a rectangular coordinates (x,y) lies on the same plane as the laser beams S and S'. The signals generated by the other axis of the position detector will be used to monitor the laser beam position on the active area of the detector at the initial setup and during measurement process.

Figure 6A:
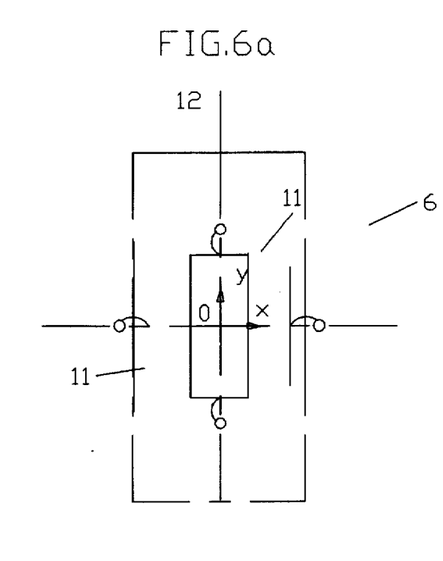
FIG. 6a and 6b show the front and side views of a single axis position sensitive detector as the additional measurement receiver.
Figure 6B:
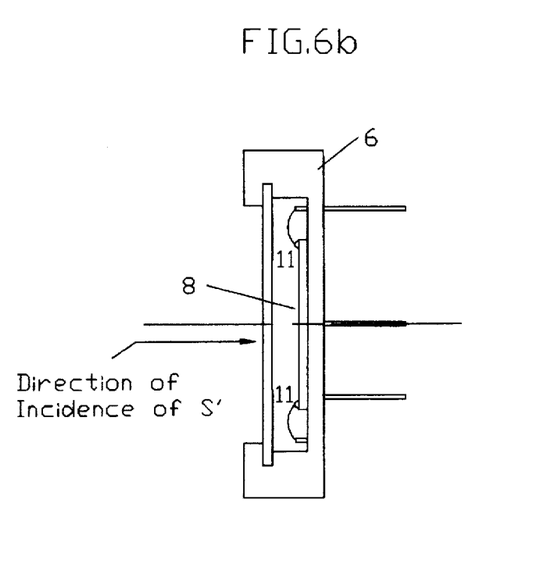

The same result of beam movement can also be achieved by a single axis position sensitive detector with the measurement axis aligned with beam angular deflection as shown in FIG. 6, while not being able to monitor the beam position in other direction.

In the course of measuring the rotating torque with the above described components, the beam S is reflected back to the detector 6 about 20 degrees for every rotation.

In order to exclude errors due to natural fluctuations of the light in the surroundings, it is advisable either to modulate laser beams with a higher frequency or to use a optical band filter 4 (shown in FIG. 1b) so that only the reflected laser S' emitted from the emitter will contribute to the measured signals.

The sensing member will be statically calibrated before use so that a linear relationship can be obtained.

I claim:

1. Apparatus for measuring torque transmitted by a rotating shaft S1, that comprises:
   a sensing member S3 mechanically coupled axially with shaft S1 and shaft S2 through which torque is transmitted, said sensing member S3 comprising a torsional shaft S4 and a tubular transfer shaft S5 joined rigidly at one end and free to rotate with respect to each other at the other end wherein the transfer shaft S5 contains a window at the other end;
   a signal emitter 1 positioned facing the window on the sensing member S3 to emit a collimated laser beam S essentially perpendicular to the shaft S4;
   a signal reflector RM positioned on the other end of said sensing member S3 in the path of said signal S from said emitter reflecting the signal received from said emitter back to a signal receiver by a light beam S' essentially perpendicular to the shaft;
   a signal receiver positioned facing the window on the sensing member S3 to receive the signal S' reflected by said reflector RM and producing an electrical signal determined by the position at which the signal from said reflector impinges on said receiver, said signal receiver comprising a measurement receiver 6 generating a signal, which corresponds to the distance of a light beam incidence point A from a fixed reference point 0 in a measurement plane essentially perpendicular to the light beam S', whereby said signal indicates the relative angular displacement of the torsional shaft S4 with respect to the transfer shaft S5.

2. Apparatus as in claim 1, wherein said light emitter has a laser diode 2.

3. Apparatus as in claim 1, wherein said sensing member S3 comprising a torsional shaft S4 and a hollow transfer shaft S5 joined rigidly at one end and free to rotate with respect to each other at the other end at which a bearing is placed between S4 and S5 and a plane mirror M1 is attached to the torsional shaft S4 and another plane mirror M2 is attached to the transfer shaft S5 at essentially the same axial location at the free end of the sensing member S3 to form a retroreflector RM with the apex axis of the mirror system essentially parallel to the shaft S4.

4. Apparatus as in claim 1, wherein said measurement receiver 6 is a single axial or bi-axial, analog, photoelectric, semiconductor position detector.

5. Apparatus as in claim 1, wherein an optical system 5, which reduces the diameter of the light beam S' is connected in optical series with said measurement receiver 6.

6. Apparatus as in claim 1, wherein another optical system 4, which only allows the light of certain frequency to pass, is connected in optical series with said measurement receiver 6.

7. Apparatus as in claim 1, wherein said signals, generated by the measurement receiver 6, correspond to the rectangular coordinates (x,y) of the distance of the light beam incidence point A from a fixed reference point 0 in a measurement plane essentially perpendicular to the light beam S', whereby one of said signal axis lies within the plane perpendicular to shaft axis and said signals are used to indicate the relative angular displacement of the mirror M1 with respect to mirror M2.

8. Apparatus as in claim 1, in which the apex of said retroreflector lies parallel with respect to the shaft S1 or S2.

9. Apparatus for measuring torque transmitted by a rotating shaft S1, that comprises:

a sensing member S3 mechanically coupled axially with shaft S1 and shaft S2 through which torque is transmitted, said sensing member S3 comprising a torsional shaft S4 and a tubular transfer shaft S5 joined rigidly at one end and free to rotate with respect to each other at the other end wherein the transfer shaft S5 contains a window at the other end;

a signal emitter 1 positioned facing the window on the sensing member S3 to emit a collimated laser beam S essentially perpendicular to the shaft S4;

a signal reflector RM positioned on the other end of said sensing member S3 in the path of said signal S from said emitter reflecting the signal received from said emitter back to a signal receiver by a light beam S' essentially perpendicular to the shaft;

a signal receiver positioned facing the window on the sensing member S3 to receive the signal S' reflected by said reflector RM and producing an electrical signal determined by the position at which the signal from said reflector impinges on said receiver, said signal receiver comprising a measurement receiver 6 generating a signal, which corresponds to the distance of a light beam incidence point A from a fixed reference point 0 in a measurement plane essentially perpendicular to the light beam S', whereby said signal indicates the relative angular displacement of the torsional shaft S4 with respect to the transfer shaft S5;

a signal receiver TT housed in transducer T and facing the temperature target T1 on sensing member of S3 to receive emitted infrared radiation from the sensing member S3 at its operation temperature.

10. Apparatus as in claim 9, wherein said signal receiver TT is a non-contact infrared thermal couple.

* * * * *